United States Patent
Tang et al.

(10) Patent No.: US 7,290,029 B2
(45) Date of Patent: Oct. 30, 2007

(54) INPUT SYSTEM AND METHOD IN WHICH CANDIDATE CHARACTERS SUBMITTED BY A USER ARE RECOGNIZED AND RECOGNIZED CHARACTERS ARE RETURNED TO THE USER

(75) Inventors: Donald T. Tang, Mt. Kisco, NY (US); Hui Su, Beijing (CN); Jingtao Wang, Bejing (CN); Qian Ying Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 09/884,366

(22) Filed: Jun. 19, 2001

(65) Prior Publication Data

US 2002/0075300 A1    Jun. 20, 2002

(30) Foreign Application Priority Data

Jun. 20, 2000    (CN) ............................... 00 1 18657

(51) Int. Cl.
*G06F 15/16*    (2006.01)

(52) U.S. Cl. ...................... 709/203; 709/217; 709/219; 345/744; 345/749

(58) Field of Classification Search ................ 709/203, 709/217, 219; 345/744, 749
See application file for complete search history.

(56) References Cited

U.S. PATENT DOCUMENTS

| | | | |
|---|---|---|---|
| 5,715,453 A | 2/1998 | Stewart | |
| 5,751,957 A | 5/1998 | Hiroya et al. | |
| 5,867,651 A | 2/1999 | Dan et al. | |
| 6,185,625 B1 * | 2/2001 | Tso et al. | 709/247 |
| 6,314,458 B1 * | 11/2001 | Steele et al. | 709/219 |
| 6,516,338 B1 * | 2/2003 | Landsman et al. | 709/203 |
| 6,728,762 B1 * | 4/2004 | Estrada et al. | 709/218 |

* cited by examiner

*Primary Examiner*—Krisna Lim
(74) *Attorney, Agent, or Firm*—Ido Tuchman; Lisa M. Yamonaco

(57) ABSTRACT

An input method, system and apparatus based on a network and an input system thereof, in which a user selects a desired language and desired input method(s) by downloading an applet from a server and sends the input characters to be recognized, and then the server sends the recognized results back to the user.

24 Claims, 3 Drawing Sheets

Fig. 4

Data Structure of User Profile

| History Results Area | Character1. Selected Language Candidate Characters and the Confidence Values | Character2. Selected Language Candidate Characters and the Confidence Values | - - - - - - - |
|---|---|---|---|
| Current Input State Area | User Identification | Current Selected Language | Current Selected Input Method | Candidate | Current state | Buffer for unrecognized characters |

INPUT SYSTEM AND METHOD IN WHICH CANDIDATE CHARACTERS SUBMITTED BY A USER ARE RECOGNIZED AND RECOGNIZED CHARACTERS ARE RETURNED TO THE USER

FIELD OF THE INVENTION

The present invention relates to an input method, apparatus and system, especially a text input method and system via a network.

BACKGROUND

Although currently many input software products are available in the market, none of them can completely solve the input problem for all languages. Usually, people need to have specific software for a specific language. For example, there are different input methods for Chinese. Furthermore, even for one language, there are multiple input methods. User needs to install different software for different language or even different input methods. There is no such total solution for every language and every input method.

To make things worse, not all the input methods are supported by each operating system. Users have to switch input methods on different operating systems. And for different devices, different input software products are used. For example, the input software for handheld device and set-top box are not compatible. User needs to purchase different software for their devices.

Input problems on pervasive devices are even more serious because of these kinds of devices innate limitation of storage and data processing ability.

Further more, Internet browser is now becoming more and more popular, it has been and will continue to be incorporated in all kinds of devices. And the technology of browser is becoming more powerful; it can support not only multi-language display but also java virtual machine. Such technology advance makes the input methods through web service feasible.

SUMMARY OF THE INVENTION

The first aspect of the invention is to provide a network based input method and system, which makes the users to select a method from multiple input methods and multiple languages to perform text inputs.

The second aspect of the invention is to provide a network based input method and system, to make the users select more than one method from multiple input methods at the same time and perform combinative text inputs.

To achieve these and other aspects, the invention also provides an input method based on a network, said network comprises at lease one server, one or more clients which have browsers for accessing said server, characterized in that: a user can input character by accessing server via said browser.

To further achieve these and other aspects, the invention also provides an input method based on a network, said network comprises at lease one server, one or more clients which have browsers for accessing said server, characterized that: an user can input character by accessing server via said browser.

FIG. 1 is the composition sketch map of the input system described by the invention.

FIG. 2 Shows the block diagram of the client part of the input system described by the invention.

FIG. 3 is the block diagram of the server part of the input system described by the invention FIG. 4 Shows the data structure of the user profile of the input system.

BRIEF DESCRIPTION OF THE DRAWINGS

These and other aspects, features, and advantages of the present invention will become apparent upon further consideration of the following detailed description of the invention when read in conjunction with the following drawing figures.

DESCRIPTION OF THE INVENTION

The invention presents an input system based on a network, said network comprises at lease one server, one or more clients which have browsers for accessing said server, characterized in that: a user can input character by accessing said server via said browser. The browser in the client side will download a special applet designed for the client from the server via the network, and the applet will communicate and exchange data will the server latter. In the said server part of the invention, there exist the following components: Communication Module, which is used to exchange message and data with the client via the network; User Profile Manager, which is used to store and manage information come from different clients or users; Input method Engine Pool, where different kinds of input methods/engines of different languages are stored; Operation Manager, according to the information(language, input method, input from client, etc.) for each user in the user profile, Operation Manager selects the input method for related language from Engine Pool, and feeds the input to the engine to get results.

The invention also provides an input method based on a network, said network comprises at lease one server, one or more clients which have browsers for accessing said server, characterized in that: a user can input character by accessing server via said browser. The method includes the following steps:

The client connects to said server via said browser.

Downloading a applet from said server, in which said applet has a dynamic user interface generator, an input method selecting interface module, and a network interface module.

Selecting destination language and input method by the above mentioned input method selection interface, and sending the selection information to the server.

The server sends the user interface layout file to the client according to the language and input method selection from the client.

The Dynamic User Interface Generator in the client part will generate proper user input interface dynamically based on the user interface layout file from the server.

The end-user can input text via the generated interface in the former step, and the client will encode and send all the input information to the server.

The server recognizes/transcodes the received input information from the user, and sends the recognition/transcoding results to the client.

The results are shown on the user interface of the client, the user can do modification operations on the results.

The invention also provides an input method based on a network, the characters input by the user using multiple methods are recognized by using the Multi-Input Method Combiner, which is located in the server part. The above-mentioned Multi-Input Method Combiner generates the recognition results by making intersection operations on candidates sets of different input methods step by step.

Figure 1:
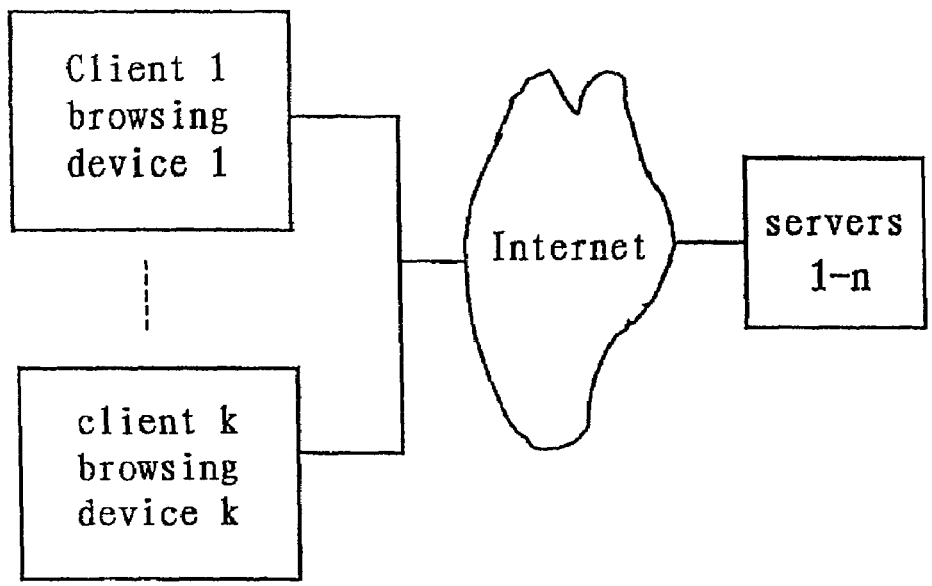
FIG. 1 is the composition sketch map of the input system described by the invention.

FIG. 1 is the composition sketch map of the whole input system. The system includes servers 1-*n*, one or more clients 1-*k*. In this system the server(s) is(are) connected with all the client(s) via network, for example the Internet. The browsing devices 1-*k* in the clients 1-*k* are used to make communications between the clients and the servers; the user can get services from the server via the browsing device from the clients. In the invention, the user can require proper input methods from the server by the browsing devices, and can also use the input method provided by the server to input texts.

The client part of the input system will be described with detail.

Figure 2:
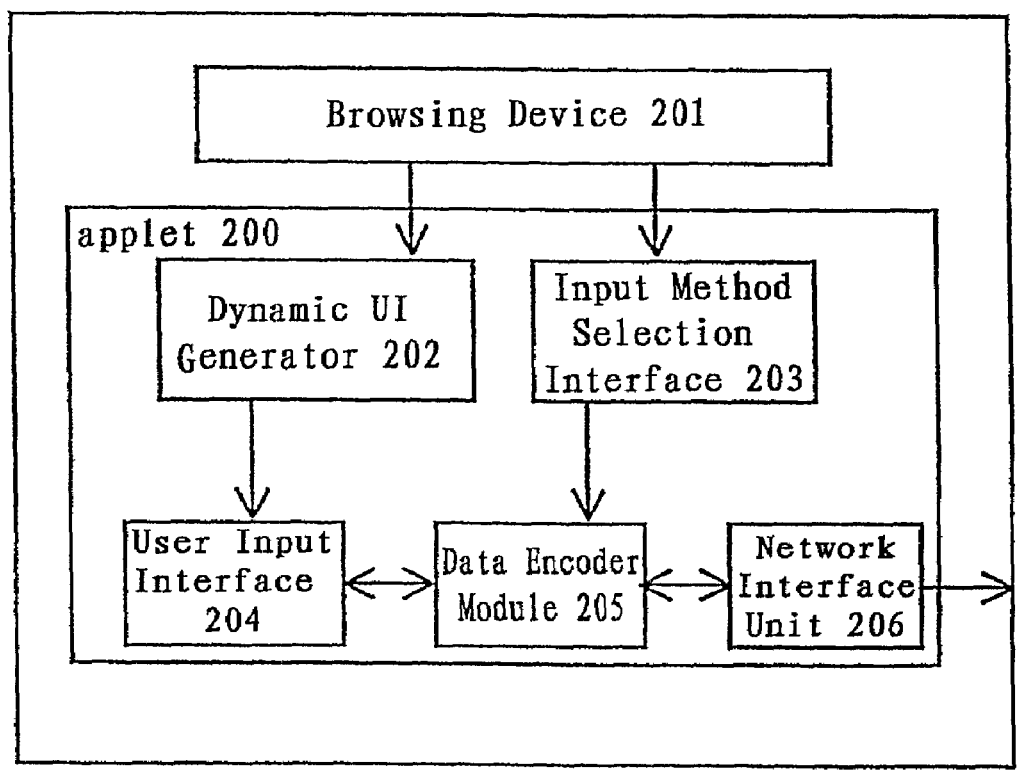
FIG. 2 Shows the block diagram of the client part of the input system described by the invention.

Refer to FIG. 2, according to the invention, the client part of this input system is composed by the following blocks: Browsing Device 201, by which the user communicates with the server; the Browsing Device 201 will download an applet program 200 from the server, which contains four parts, the Dynamic User Interface Generator 202, Input Method Selection Interface 203, Data Encoder Module 205, and the Network Interface Unit 206.

The Dynamic User Interface Generator 202 can generate an User Input Interface 204 dynamically according to the selected input method and selected language by the user. The detailed information of this procedure will be described later.

The User Input Interface 204 is used to capture the data input by the user, and is used to display the results. The User Input Interface 204 may have the ability to accept the user input information from various input devices, for example, keyboard, mouse, touch screen, pen, microphone etc, and can do proper visual feedbacks according to the input methods selected by the user.

Besides the input capturing function of User Input Interface 204, another main function of this module is the display of the result on device 201. After receiving feedbacks from server, the User Input Interface 204 displays them on the device browser 201. Because the browser 201 supports the display of complete character sets for all language, the server only need to send back the internal codes of recognition results. Otherwise, the server will send back not only the internal codes, but also the pixels for displaying at the browser end.

Another advantage of User Input Interface 204 is that it detects the information on the client browser 201 and configures the user interface according to the display. For those pervasive devices with limitation for display, this function is important for more friendly user interface.

The Data Encoder Module 205 processes the captured raw input data and combines them with other information such as the user notification ID, the selected input method information (or methods). In order to minimize the data to be transferred, in the invention, the Data Encoder Module 205 may include an input method based code compressor (not shown in current figures). For each input method, the input data is different in character frequency. In order to achieve higher compressing rate, each input method is allocated a different compressing algorithm based on the most character frequency of the input data.

The Network Interface Unit 206 administrates the data received and sending from/to the server end. It includes an encryptor to encrypt the data package for transferring as well as a decryptor to decrypt the data package from the server. The server part also has the corresponding encryptor and decryptor function.

The basic structure of the server part of this input system is described as below.

The server handles the entire input request from the client, receiving the data sent from the client, providing user interface configuration and layout for client, interpreting the client data to related user profile information, and generating results and sending them to the client.

Figure 3:
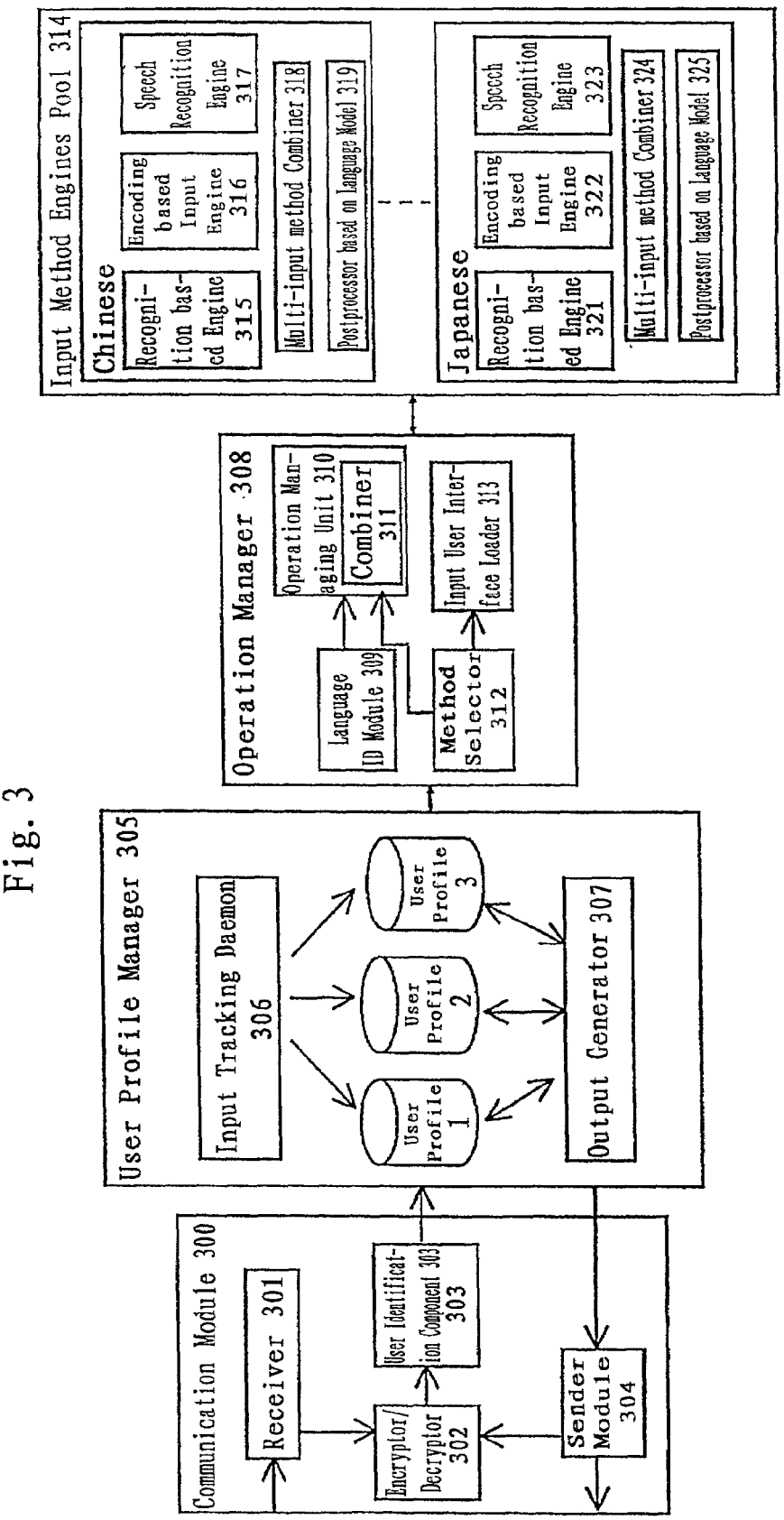
FIG. 3 is the block diagram of the server part of the input system described by the invention FIG. 4 Shows the data structure of the user profile of the input system.

As shown in FIG. 3, the server part includes the following components:

Communication Module

This module includes a Receiver 301, which receives the messages sent from the client. A Encryptor/Decryptor 302, used to decrypt or encrypt the information received or to be sent. An User Identification Component 303, which reads the user ID from the messages deciphered and sends the information to the balance scheduler if necessary. The Sender Module 304 calls the encrypt function first to package the messages sent to the client and then sends the messages out.

User Profile Manager

The User Profile Manager 305 records and manages all the user information from different clients. In this module, each user has a related profile storing his/her information. This profile is initialized when the user connects to the server and requests for input service. It includes the user ID information, language selection, and input method selection. During the input procedure, the profile records all the input sent from the client by the user and stores the related recognition results generated from the Operation Manager 308. Further more, the user profile is divided into two sub-areas: History Results Area and Current Input State Area, wherein, the History Results Area is used to store the candidate characters generated by different engines in Engine Pool 314 as well as the confidence values of each candidate character. The Current Input State Area is used to save the original data from the client, current temporal recognition result and all the current state information. The data structure of the user profile is shown in FIG. 4.

Several sub-modules are included in this User Profile Manager 305 to respond to the Operation Manager 308. And these sub-modules include Input Tracking Daemon 306, used to extract all the input the user made and add data to the profile for this user. Also the user profile will provide the user input information for the Operation manager to get the input results. The results of the input got from the Operation Manager will also be stored in the profile. The Output Generator 307 takes the results from the profile and formats the results into HTML.

Operation Manager

The Operation Manager 308 includes a language ID module 309, used to get the language the user is now using from the user profile; a method selector 312, used to get the method the user is now using from the user profile; an operation managing unit 310, used to select an input method engine from the input method engine pool based on the information in the profile, such as selected language; selected input method, and sends the user input based on the input method to the engine to recognize the input character; an input user interface loader 313, used to read input user interface configuration information from the input method engines pool 314 based on the selected method, and configure the input user interface layout. The layout will then be stored in the user profile and sent to the Dynamic User Interface Generator 202 to further generate an input user interface for using. If a user selects multi-methods, the input user interface loader 313 will generate a combined input layout for the user. Furthermore, the operation managing unit 310 includes a combiner 311, used to decide whether the user selects multi-methods or not, and fetch a set of candidates of different selected methods from the engine pool 314 if yes.

Engine Pool

The Engine Pool 314 is a pool for all kinds of input methods. All the input methods are grouped by languages, e.g. for example, Chinese, Japanese. For each input methods, the engine, related database and user interface layout information are stored. The mapping based input method includes Encoding based Input Engine 316, 322, like Code Book Recognizer, code generator, etc. The Handwriting input method includes HW recognition engines 315, 321. The speech input method includes speech recognition engine 317, 323. For each input method, there is special user interface data for browser displaying in different device. Besides different input methods for each language, there is another part for specific language, which is the Postprocessor based on language model 319, 325. This part is the common part for different input methods for one language, which provides the language or context information to get more accurate results. Multi-input method Combiner 318, 324 is another important part for each language. It will handle how to combine the results from different methods. The results from Multi-input method combiner 318 will be directly sent to the Combiner in the Operation Manager 308.

In order to support the need of many users simultaneously, a server cluster including many powerful machines must be exploited to achieve this goal. At this time, the invention may include one Balance Scheduler, which is located between the Communication Module 300 and many servers using the invention. The Balance Scheduler allocates the user requests and balances the computing resources of the server cluster.

After explaining the basic architecture of this system, here we will explain how the users can do text input operations using the input system described in this disclosure.

In convenience of our description, lets suppose there exists a user who is using his laptop computer. He now wishes to send one of his friends an e-mail in China, however, he has no Chinese input software installed in his current laptop computer. He can use the input system in this system to do the Chinese text input at this time. To achieve this goal, the user should do the following work.

1) Initial Connection

The user must finish the system initialization task first, this task is done by accessing the server, which provides the input system described in the invention. The user first launches his Browsing Device 201 on his machine, and builds the connection with the server. After the browser at client end first gets connected with the server, the server generates an exclusive user identification (user ID) and initializes a user profile related to this user identifier on a specific sever machine. Then the server sends the user ID as well as the client end applet 200 back to the users browsing device. The user ID can be sent to the client as a cookie. After accepting the applets 200, the browser 201 launches the applet. At this time, the initialization work is finished.

In an example embodiment of the invention, after the applet 200 is launched, an initial user interface and a default input method is shown on the browsers client area. In this example, the default English input method interface is displayed.

From now on, the user can do input work using the downloaded applet.

2) Input Language & Input Method Selection

The user can select the destination language by using Input Method Selection Interface 203, in this example, the user chooses Chinese; then the user selects the Five Stroke input method of Chinese language. The selection information made by the user is sent to the server via Communication Module 300. The information of selected language, selected input method is then stored in the user profile corresponding to this user. Then the User Profile Manager 305 notifies the Operation Manager 308 about the user language & input method selection stored in the user profile.

The Dynamic User Interface Generator 313 in the Operation Manager 308 gets the corresponding user interface information from the Engine Pool 314 and generates the user interface layout for this user. The user interface layout is sent back to the related users user profile, and sent to the Sender module 304 by Output Generator 307. The layout is at last sent to the client by the Sender module 304.

The User Interface Generator 202 in client part interprets the layout information, and generates the User Input Interface 204. The User Input Interface 204 can be composed by the keyboard bitmap display on the interface or any other style, which can help the user to finish text input jobs.

The user can switch input method if he needs, for example, from Five Stroke to Handwriting and Pinyin combination. The operation is similar with the operations described above. However, the User Input Interface Loader 313 will combine the layout information of "Pinyin" and "Handwriting" to generate a uniform presentation. The User Interface Generator 202 in the client part will generate a combined input interface according to the received combination layout information. When the user changes his input method, the new layout file will be downloaded from the server and the old one will be discarded.

3) Input Using the Selected Input Method

After the user finished the input of one character, for example, when the user finished typing the stroke information of character "□" in the "Five Stroke" input area of User Interface 204, the Data Encoder Module 205 will encode and encrypt the original "Five Stroke" keystrokes of character "□" as well as the user identity information to a data package. The Network Interface Unit 206 then sends the data package to the server.

In the server part, after the receiver 301 receives the data package, the User Identification Component 303 will recognize the user ID from the package. After decrypting by the Encryptor/Decryptor module 302, the User Input Tracking Daemon 306 in the User Profile Manager 305 will extract the keystroke information of character "□", and save it in the Current User Stage Area of the user profile. The Operation Manager Unit 310 will select corresponding engine from Engine Pool 314 according to the information read by Language Selector 309 from the user profile, method selection information read by Method Selector 312 from the user profile. In this case the selected engine is encoding based input engine 316. This engine will translate the user input keystrokes into Chinese character.

When a character is recognized, the Operation Manager Unit 310 will put the results to the history area of the user's profile, and notify the Output Generator 307 in the User Profile Manager 305. This output generator reads the information from the user profile database and does the code formation translation work if needed, for example, from GB to BIG5, or BIG5 to UNICODE if the user needs, then generating the result HTML page from the results. The destination data format to be displayed on the client side is now generated. The Output Generator next sends the result to the Sender. The Sender then seeks the user address and sends the result to the correct address.

After the user finished using the input method, he/she can copy & paste the Chinese results to the E-Mail software he uses and then sends the e-mail out.

If the user prefers, the results will also pass through a Language model based post processor to get result more accurately and quickly, this post processor is shared by all the input methods of a specific engine 4) Combinative Input In this section we will describe another feature of the invention—Combinative Input method. For the convenience of describing, suppose we select the "Pinyin" input and "Handwriting" input for combinative input. The user wishes to input the Chinese character "戊", using handwriting via the handwriting input area of the input method. However, there exists many Chinese characters that have similar shape as "戊", e.g. "成", "戒","我", the user is not quite sure of this handwriting of character "戊". So he writes one Chinese character which he thinks it should be "戊", the server responses the input, according to the procedure described above, the candidate characters generated by recognition based engine 315, e.g. "戊", "成", "戒","我", is put into the History Area of user profile. And then sent to the client. At this time, the user input the pinyin of this character—"wu". Responding to this input, the server sends candidates of the pinyin method generated by Encoding based engine 316 to the Current Input State Area. Since the user has selected combinative input method this time, the User Input Combiner in the server combines the result from handwriting recognition and Pinyin translation, generates final result by intersecting the two candidates sets. In this case, we get the final result "戊", this result will update the contents of the History Area of the user profile, and then sent to the client.

By using this kind of input method combination, the user is released from the tiresome procedure of candidate selection. Of course, the combinative Input described in the invention is not limited to combining handwriting input with Pinyin input method. In fact, the user can build any kinds of combinations from the input methods provided by the server.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention have been described in detail with figures and examples. The descriptions are not intended to make limitations on the invention. The detailed implementations be modified or improved without departing from the essence and scope of the invention.

Having thus described our invention, what we claim as new and desire to secure by Letters Patent is as follows:

1. An input method comprising:
   one or more users having browsers for accessing a server based in a network,
   at least one of said users inputting characters by accessing said server via one of said browsers;
   connecting to said server via said browser;
   downloading an applet from said server, in which said applet has a dynamic user interface generator, an input method selecting interface module, and a network interface module;
   selecting proper language and input method by using said input method selecting interface module, and sending selected information to said server;
   sending by said server an input interface layout to said client according to selected information;
   generating by said dynamic user interface generator a user interface based on the input interface layout;
   inputting characters via said generated user interface and sending said characters to said server;
   recognizing by said server the received characters, and sends the recognized results to the client; and
   displaying the results in the input interface of the client.

2. The input method according to claim 1, characterized in that:
   the step of said server sending an input interface layout to said client according to selected information further includes:
   an input user interface loader in the server reads one or more user interface information from an input method engine pool, according to the selected one ore more input method, and then configures the appropriate input user interface layout.

3. The input method according to claim 1, characterized in that: the step of said server recognizing the received characters, and sending the recognized results to the client further includes:
- a user profile manager stores and manages information sent from different clients;
- an operation manager selects an input method engine from an input method engine pool to recognize the input characters;
- a communicator sends the recognized result to the client.

4. The input method according to claim 3, characterized in that:
- further comprising the step: a balance scheduler allocates the user requests to a plurality servers.

5. The input method according to claim 4, characterized in that:
- the information sent from the client is stored in the user profile which has a history area for storing previous recognized candidates, and a current input area for storing the candidates of the current recognizing characters.

6. The input method according to claim 5, characterized in that: further comprising the step: a multi-input method combiner in the server combines the different recognized candidates of different input methods.

7. The input method according to claim 6, characterized in that: said multi-input method combiner obtains the recognized results by intersecting the recognized candidates of different input methods.

8. The input method according to claim 6, characterized in that: further comprising the step: a postprocessor based on language model in the server forecasts the recognizing character based on the recognized candidates.

9. An article of manufacture comprising a computer usable medium having computer readable program code means embodied therein for causing an input method based on a network, the computer readable program code means in said article of manufacture comprising computer readable program code means for causing a computer to effect the steps of claim 1.

10. A program storage device readable by machine, tangibly embodying a program of instructions executable by the machine to perform method steps for an input method based on a network, said method steps comprising the steps of claim 1.

11. An input system based on a network, said network comprises at least one server and one or more clients the input system comprising:
- one or more browsers for accessing said server by the clients, the browsers configured to download an applet from the server to input characters and to display the results; and
- said server comprising:
  - a communicator for sending and receiving data to/from the client;
  - a user profile manager for storing and managing information of different clients;
  - an input method engines pool for storing different input method engines of different languages; and
  - an operation manager for selecting an appropriate input method engine based on the selected language and selected input method, and for sending the input characters to be recognized to the engine.

12. The input system according to claim 11, characterized in that:
- said applet includes:
  - an input method selecting interface module for selecting language and input method; a dynamic user interface generator for dynamically generating an input user interface;
  - a data encoder for compressing the input information; a network interface module for sending and receiving data to/from the server.

13. The input system according to claim 11, characterized in that: said data encoder has an input method based code compressor for allocating different parameters of compressing algorithm to different input methods.

14. The input system according to claim 13, characterized in that:
- said server further has a balance scheduler to allocate the user requests to a plurality of servers and to balance the computing loads of the servers.

15. The input system according to claim 13, characterized in that said communicator includes:
- a receiver for receiving the information sent from the client to the server;
- a decryptor/encryptor for decrypting and encrypting the information received or sent out; and
- a user identification component for reading the user id from the information deciphered.

16. The input system according to claim 11, characterized in that: said user profile manager includes:
- one or more user profiles for storing the user id information, the language selection and the input method selection, and the data sent from the client, said profile is further divided into two parts: a history area for storing previous recognized candidates, a current input area for storing current recognized candidates;
- an input tracking daemon for extracting all the input received from the client;
- an output generator for taking the results from the profile.

17. The input system according to claim 16, characterized in that:
- the operation managing unit further includes a combiner, for deciding whether the user selects multi-methods and for getting combinated candidates of different selected methods if the user selects multi-methods.

18. The input system according to claim 16, characterized in that:
- the input method engines pool includes:
  - a plurality of input method engines for recognizing the input characters;
  - a multi-input combiner, for combining the candidates of different methods if the user selects multi-methods to input characters; a postprosessor based on language model, for forecasting the recognizing character based on the previous recognized candidates.

19. The input system according to claim 18, characterized in that the input method engines include:
- handwriting recognition engine for recognizing the handwriting input information;
- speech recognition engine for recognizing the speech input information; and
- code-based recognition engine for recognizing the input character by matching.

20. The input system according to claim 11, characterized in that:
- said operation manager includes:
  - a language id module for getting the language the user is now using from the user profile;
  - a method selector for getting the method the user is now using from the user profile;

a operation managing unit for selecting an input method engine from the input method engine pool based on the output of the language id module and the method selector to recognize the input character;

an input user interface loader for reading input user interface configuration information from the input method engines pool based on the selected method, and for configuring the input user interface layout.

21. A computer program product comprising a computer usable medium having computer readable program code means embodied therein for causing an input method based on a network, the computer readable program code means in said computer program product comprising computer readable program code means for causing a computer to effect the functions of claim 11.

22. An input method comprising:

inputting characters by accessing a server via a browser;

connecting to said server via said browser;

downloading an applet from said server, in which said applet has at least one of: a dynamic user interface generator, an input method selecting interface module, and a network interface module;

selecting a proper language, and sending selected information to said server, said server sending an input interface layout to said client according to selected information, said dynamic user interface generator generating a user interface based on the input interface layout;

inputting characters and sending said characters to said server, said server recognizing the received characters, and sending the recognized results to the user; and displaying the results for said user.

23. An article of manufacture comprising a computer usable medium having computer readable program code means embodied therein for causing an input method, the computer readable program code means in said article of manufacture comprising computer readable program code means for causing a computer to effect the steps of claim 22.

24. A program storage device readable by machine, tangibly embodying a program of instructions executable by the machine to perform method steps for an input method, said method steps comprising the steps of claim 22.

* * * * *